WILLIAMS & CULBERTSON.
Rifling Machine.
No. 7,178. Patented March 12, 1850.
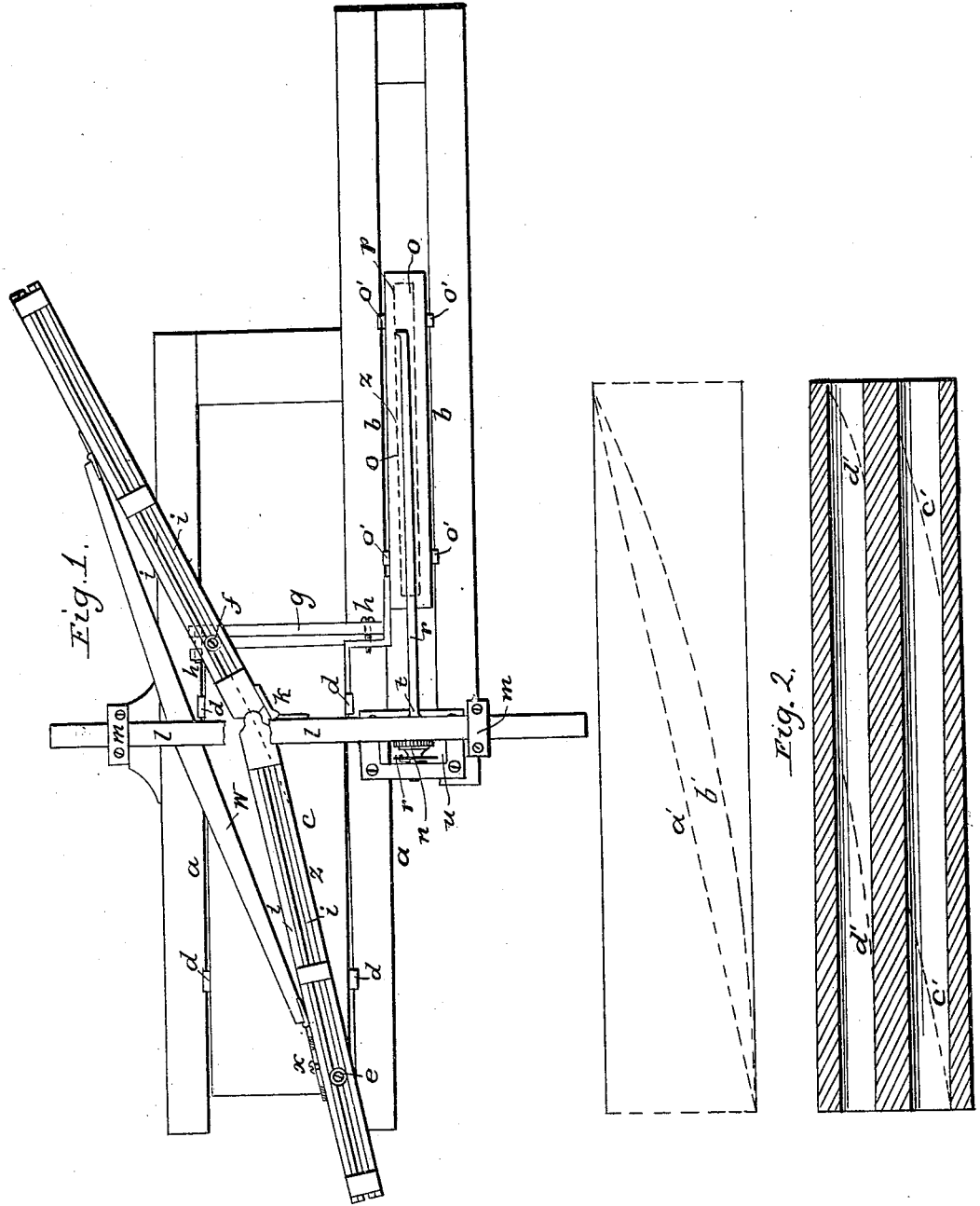

UNITED STATES PATENT OFFICE.

EDWIN WILLIAMS AND JAMES CULBERTSON, OF KENTON COUNTY, KENTUCKY.

MACHINE FOR GIVING INCREASED TWIST IN CUTTING RIFLES.

Specification of Letters Patent No. 7,178, dated March 12, 1850.

*To all whom it may concern:*

Be it known that we, EDWIN WILLIAMS and JAMES CULBERTSON, of Kenton county, Kentucky, have invented new and useful Improvements in Guides for Cutting the Groove in Rifles or other Firearms; and we do hereby declare the following to be a full, clear, and exact description of the construction and operation of the same, reference being had to the annexed drawings, Figure 1 being a plan of the same—that is, a view of the machine as seen from above—and Fig. 2 being a diagram explanatory of the lines traced by the cutter under different arrangements of the guide, the drawings being made part of this specification.

The nature of our invention consists in so arranging a rifle guide in a machine for rifling or cutting the groove in rifles, or other fire arms, that the machine can be made to cut a straight groove in the bore of the rifle; or be made to cut a regular twist making a fraction of a revolution or a number of revolutions in the length of a barrel; or be made to cut a groove gradually increasing or decreasing in its twist as it approaches either end, being adjustable at pleasure to any required ratio of increase or decrease.

Hitherto the rifle groove has been made by means of a mandrel attached to a cylinder, with its periphery grooved spirally, which, as it is thrust forward, is caused to revolve by a stud or pin which is fixed to the frame work and traverses the groove. This groove may be made regular or irregular, but can only cut one twist, and it may have an index so as to enable it to cut a number of these grooves in one barrel, or the barrel may be partially rotated answering the same purpose; but it is evident that this is a very imperfect method of producing a twisted groove, inasmuch as but very few grooves can be cut upon one cylinder, and there is a want of accuracy after a slight use when made of wood, as they usually are, or if made of metal there is a heavy cost in their construction. The rifle groove has likewise been made as in the United States rifles by means of a cutter or saw on a mandrel attached to a follower passing backward and forward through the head which rotates it; on the rotating shaft is a bevel wheel which works into a similar one, the axis of which is horizontal but transverse to the former, and on the axis of the latter is a pinion gearing into a rack on the under side of the follower which advances the mandrel through the barrel; the compound of the two motions, the forward or backward, and the rotary, producing the twist. In this case a regular twist alone is produced, and unless the gearing is changed—but one twist. This may answer very well for U. S. rifles where a good twist being once established, the pieces being all required for the same duty, all the requisite results may be attained; but for the various requirements of sporting men, and the different services for which the pieces are required, the last mentioned device, like the former, by no means fulfils the requirements of a gunsmith of the "better sort." Other devices might be mentioned.

We regard it as superogatory to enlarge upon the practical superiority of an increase twist. Theory and practice are in favor of it so far as we are aware. It seems but rational that as the ball advances, and acquires additional velocity from the pressure in the rear being continued, that there would be a gradually increasing speed of rotation (the motion being once generated and the controlling power still in operation) which should be met by a corresponding increase of twist. All these requirements are attained by means of a guide having the requisite adjustments—causing a transverse traversing bar with a rack on its lower surface to slide in its bearings and rotate a wheel in a head piece in which is chucked a mandrel which enters the bore of the rifle and carries the cutter or saw for forming the groove. The adjustments are in the guide with its chord piece and set screw—and the traversing screw; the other screw remaining fixed permanently to the sliding bed or carriage.

The mode of operating is as follows: On ways or shears (*a*) is a traversing bed or carriage (*c*) sliding on cleats (*d*); on this carriage a screw (*e*) is permanently fixed; a screw (*f*) is made adjustable in a slot running transversely at the end of the carriage, and is confined in its position by a clamp (*g*) fastened by screws (*h, h,*). The screws (*e, f,*) by the motion of the carriage traverse in slots the length of the guide (*i, i, i, i,*) which is formed of two parts hinged together. One section of the guide is hinged at (*k*) to a transverse traversing bar (*l*) which slides in bearings (*m, m,*) and having on its lower surface a rack gearing into a spur wheel; the cogs of which partially appear in the plan; as the carriage progresses the screws (e, f,) thrust the guide (i) which is hinged to the bar (l) away from one of the ways (a) toward the other, causing the bar to traverse in its bearings and rotate the wheel (n). The bed or carriage (o) having cleats (o') is attached by means of a connecting piece (s) to the carriage (c). It traverses or slides on ways
(b) which are parallel to the ways (a), one of them being as it were a continuation of one of the ways (a) and a part common to both. The motions of the carriages are identical and simultaneous. On the carriage (o) the barrel shown by dotted lines (p), is suitably fixed by dogs. It will thus be seen that the barrel approaches the head piece (t) which carries the mandrel (r) to which is attached the cutter or saw, which, being rotated at the same time by the traversing bar (l) operated as described, the union and combination of the two motions produces the twist. An index plate (u) is attached to the head piece (t) having perforations into which a click (r) drops. This is for the purpose of partial rotation of the head piece (the barrel the while being permanently fixed on the bed (o)) so as to enable the operator to make a series of grooves of the same character in the bore of the barrel, commencing at a different point, and retaining their parallelism with each other throughout.

The cut may be made by either the forward or the backward motion of the carriage (o); in one case it is a thrust, and in the other a draw cut; the latter is preferred, inasmuch as there is less danger of bending the mandrel, and more steadiness.
The curved line (z) in Fig. 1 is such a one as would be traced on the table (c) by a point projecting down from the traversing bar l under the particular adjustment of the machine here shown, and is the exact path of middle joint of the guide in this instance.

When a straight cut is desired through the length of the rifle it is only necessary to loosen the screw (f) by means of the clamp (g) and screws (h, h) and bring it to a position opposite the screw (e), so that a right line drawn from the one to the other will be parallel with the ways and consequently with the axis of the mandrel; when this is the case there is no effect produced on the traversing bar (l) and consequently no rotation of the head piece (t); the cut being alone dependent upon the longitudinal motion of the carriage, is a right line, parallel with the axis of the barrel.

In the diagrammatic views Fig. 2, a' indicates the path of the traversing bar (b) along the table (c), when the guide is straightened out for a uniform twist and set at an angle giving a divergence equal to once and a half around the barrel. b' indicates the path of the traversing bar for the same divergence, but with the guide bent so as to give a rapidly increasing twist. c' shows the line traced by the tool in the first case and d' that in the second case.

When a regular twist is required the screw (f) is adjusted and fixed in position to the table at a greater or less distance from a line drawn parallel with the ways from the screw (e), in proportion as a greater or less twist is required; the less the angle that the guide forms with the ways, the less the twist, and vice versa. To cut a regular twist the guide (i, i, i, i,) must be straight, having the chord piece (w) in close proximity to it and being fastened in that position by the set screw (x).

That the adjustment of the screw (f) nearer or farther from the ways (a) will have the effect of giving a greater or less twist to the cut in the barrel will commend itself to any one who will trace the motions from the guide to the mandrel. It will be seen that the screws (e) and (f) traversing the slot in the guide form the guide into a wedge as it were, which causes the bar (l) to which it is hinged at (k) to traverse, rotating the mandrel, and in proportion as the wedge is more or less steep so is the rotary motion of the mandrel more or less rapid, the twist being in correspondence; it being essential as has been remarked to a regular twist that the guide be straight.
In an increasing or decreasing twist, the action of this machine is most favorably displayed. The lines produced are much more complicated and varied than those previously described, and the results it is believed are entirely new.

To illustrate the mode of operation of the guide let us suppose that in the bed or carriage (c) there were grooves cut, and that a point or stud projecting down from the bar (l) traversed these grooves; it will then be seen that if the groove is cut parallel with the ways (a), there will be no motion communicated to the bar (l) and the cut will be longitudinal, parallel with the axis of the barrel: when the groove is straight but recedes from parallelism with the ways, the pin or lug traversing the groove is compelled to recede also from the ways carrying the bar (l) also and causing the wheel into which the rack under the bar is geared to rotate; thus the mandrel receives its motion. The grooves being straight the rate of recession from parallelism is equal at all parts of the stroke and will vary in rapidity in the proportion of the angle it forms with the ways. Should the bar (l) be made to traverse a distance equal to the circumference of the wheel (n), one revolution of the mandrel will be effected in the length of the stroke and consequently the twist would terminate at a point on a line with that at which it commenced, having made one clear revolution this may be increased or decreased at pleasure by the adjustment of the screw (f). But let us suppose that a curved groove be cut in the bed, it will be seen that the rate of recession from parallelism gradually increases and a corresponding rate of revolution of the wheel (n). The proof of this is, that if the curve be prolonged to 90°, the cutter on the end of the mandrel, would, could the machinery operate describe a curve the plane of whose circle would be at a right angle with the axis of the barrel. This is not strictly correct, as it is only at a point where it would reach this, but we seek to illustrate the position by this supposition.

We have thus sought to illustrate by the supposition of grooves cut in the bed or carriage (c), the method (by an analogy) of regulating the twist. It will be found upon an analysis of the motion of the guide under the several adjustments of which it is capable, that the point of attachment to the bar (l) describes curved or arcs of circles the chord of which is a right line drawn from center to center of the screws (e) and (f). In making the increase twist, the jointed guide being bent, rolls as it were upon pivots formed by the screws (e) and (f) or, what is analogous they roll it. The length of the radius of the described arc is determined by the chord piece (w), and its set screw (x) and is in inverse proportion to the attitude of the described arc. The greater the radius the less the increase in a given stroke.

The set screw (f) regulates the angle which the radius of the circle whose arc is described shall bear to the ways, that is to say, the radius drawn from the point of commencement of the sweep. When a line drawn from center to center of the screws is parallel to, the screws being then equidistant from the ways (a), the axis of the barrel will be parallel to the tangent of the circle whose arc is described, projected from the point of commencement of the sweep, and of course at an angle of 90° with the radius drawn from that point. At this point is the greatest proportionate increase of twist attained; that is to say, between the twist at starting and that at leaving the muzzle, a greater ultimate twist may be attained by causing the radius to form an obtuse angle with the ways (a) by setting the screw (f) farther from them, but the disproportion between the two ends of the twist is not as great. As before remarked, the increase of twist is likewise regulated by the chord piece (w) which determines the radius.

Thus to sum up; the chord piece (w) regulates the radius of the circle whose arc is described, and the adjusting screw (f) the angle of said radius with the ways, and the axis of the barrel; the combinations of the two affording an infinitude of variety. This will serve to illustrate the principle upon which we are working. We have in our machine so constructed a guide jointed midway of its length, fastened to, and operating a traversing bar which regulates the rotary movement, with a longitudinal slot throughout its length, traversed by screws the one permanent the other adjustable fixed to the carriage which slides underneath the guide as to enable us by minute adjustments to cut increase or decrease twists as the cut is from or to the head, or the barrel has one end or the other presented; also of giving any amount of regular twist; or of cutting a straight groove. We believe that our adjustable guide is a novelty in rifling.

Having thus fully clearly and exactly described the nature, construction and operation of our invention what we claim therein as new and desire to secure by Letters Patent is—

The jointing the guide (i, i, i, i,), in combination with the chord piece (w) for sustaining it in position (or their equivalents) for the purpose of giving the guide as bent, when operated upon by the aforesaid lugs or screws or their equivalents,—a rocking motion; making the point of attachment to the traversing bar or other similar contrivance, describe a curve, with reference to the bed which traverses beneath; thereby compelling the point of attachment to the traversing bar or its equivalent to recede in a gradually increasing ratio (accompanied by an equivalent increased velocity of the rotary head) from the axis of the mandrel for the purpose of producing an increasing or decreasing twist to the groove in the bore—after the manner substantially as herein described.

EDWIN WILLIAMS.
JAMES CULBERTSON.

Witnesses:
EDWARD H. KNIGHT,
THOS. G. CLINTON.